United States Patent
Lin et al.

(10) Patent No.: US 8,919,369 B2
(45) Date of Patent: Dec. 30, 2014

(54) FLUID FLOW CONTROL MEMBERS FOR USE WITH VALVES

(75) Inventors: Chun Lin, McKinney, TX (US); Eric Alan Miller, McKinney, TX (US); Roy Ronald Pelfrey, Sherman, TX (US); Yan Tao Sun, Zhejiang (CN); Fan Jian Jun, Shanghai (CN)

(73) Assignee: Fisher Controls International LLC, Marshalltown, IA (US)

( * ) Notice: Subject to any disclaimer, the term of this patent is extended or adjusted under 35 U.S.C. 154(b) by 37 days.

(21) Appl. No.: 13/567,761

(22) Filed: Aug. 6, 2012

(65) Prior Publication Data

US 2012/0298905 A1 Nov. 29, 2012

Related U.S. Application Data

(62) Division of application No. 12/202,876, filed on Sep. 2, 2008, now Pat. No. 8,256,462.

(51) Int. Cl.
 *F16K 51/00* (2006.01)
 *F16K 1/38* (2006.01)

(52) U.S. Cl.
 CPC .............. *F16K 1/385* (2013.01); *F16K 51/00* (2013.01)
 USPC .................................... 137/328; 137/315.41

(58) Field of Classification Search
 USPC .......... 137/630, 630.14–630.15, 315.41, 327, 137/328; 251/359
 See application file for complete search history.

(56) References Cited

U.S. PATENT DOCUMENTS

| | | |
|---|---|---|
| 750,321 A | 1/1904 | Thompson |
| 1,298,849 A | 4/1919 | Wolff |
| 1,867,195 A | 7/1932 | Teller |
| 2,534,697 A | 12/1950 | Bruestle |
| 2,630,137 A | 3/1953 | Krone et al. |
| 2,638,924 A | 5/1953 | St. Clair |
| 2,710,019 A | 6/1955 | Reasoner et al. |
| 3,078,875 A | 2/1963 | Farrell et al. |
| 3,439,711 A | 4/1969 | Sherwood et al. |
| 3,469,605 A | 9/1969 | Courtot et al. |
| 3,631,893 A | 1/1972 | Seaman et al. |
| 3,631,894 A | 1/1972 | Frantz |
| 3,635,247 A * | 1/1972 | Myers ........................ 137/625.5 |

(Continued)

FOREIGN PATENT DOCUMENTS

DE  1257506  12/1967

OTHER PUBLICATIONS

Patent Cooperation Treaty, "Written Opinion of the International Searching Authority," issued by the International Searching Authority in connection with related PCT application No. PCT/US2009/053820, mailed on Nov. 18, 2009 (9 Pages).

(Continued)

*Primary Examiner* — Kevin Lee
(74) *Attorney, Agent, or Firm* — Hanley, Flight & Zimmerman, LLC

(57) ABSTRACT

Fluid flow control members for use with valves are described herein. An example fluid flow control member for use with a valve includes a body having a seat to control a fluid flow through the valve. The body defines a seating surface, an aperture to receive a stem of the valve and a plurality of substantially flat surfaces to enable gripping an exterior surface of the body.

19 Claims, 7 Drawing Sheets

(56) References Cited

U.S. PATENT DOCUMENTS

| | | | |
|---|---|---|---|
| 3,844,312 A | | 10/1974 | Sumner et al. |
| 4,026,327 A | | 5/1977 | Deinlein-Kalb |
| 4,121,617 A | * | 10/1978 | Masek et al. ............. 137/630.14 |
| 4,825,895 A | | 5/1989 | Maltman |
| 5,236,014 A | | 8/1993 | Buls et al. |
| 7,469,718 B2 | * | 12/2008 | Lambert et al. .......... 137/614.04 |
| 7,926,784 B2 | | 4/2011 | Fleming |
| 8,146,885 B2 | | 4/2012 | Lin et al. |
| 8,205,630 B2 | * | 6/2012 | McKee .................... 137/315.41 |
| 8,256,462 B2 | | 9/2012 | Lin et al. |
| 2003/0041905 A1 | | 3/2003 | Andersson |
| 2010/0051117 A1 | | 3/2010 | Lin et al. |
| 2010/0051120 A1 | | 3/2010 | Lin et al. |

OTHER PUBLICATIONS

Patent Cooperation Treaty, "International Search Report," issued by the International Searching Authority in connection with related PCT application No. PCT/US2009/053820, mailed on Nov. 18, 2009 (4 Pages).

Patent Cooperation Treaty, "Written Opinion of the International Searching Authority," issued by the International Searching Authority in connection with related PCT application No. PCT/US2009/053817, mailed on Nov. 18, 2009 (8 Pages).

Patent Cooperation Treaty, "International Search Report," issued by the International Searching Authority in connection with related PCT application No. PCT/US2009/053817, mailed on Nov. 18, 2009 (4 Pages).

Patent Cooperation Treaty, "Written Opinion of the International Searching Authority," issued by the International Searching Authority in connection with related PCT application No. PCT/US2009/053819, mailed on Nov. 18, 2009 (6 Pages).

Patent Cooperation Treaty, "International Search Report," issued by the International Searching Authority in connection with related PCT application No. PCT/US2009/053819, mailed on Nov. 18, 2009 (3 Pages).

United States Patent and Trademark Office, "Notice of Allowance," issued in connection with U.S. Appl. No. 12/202,876, mailed on May 2, 2012 (14 pages).

United States Patent and Trademark Office, "Non-Final Office Action," issued in connection with U.S. Appl. No. 12/202,876, mailed on Nov. 16, 2011 (13 pages).

United States Patent and Trademark Office, "Restriction Requirement," issued in connection with U.S. Appl. No. 12/202,876, mailed on Aug. 5, 2011 (6 pages).

United States Patent and Trademark Office, "Non-Final Office Action," issued in connection with U.S. Appl. No. 12/467,152, mailed on Apr. 25, 2012 (29 Pages).

United States Patent and Trademark Office, "Restriction Requirement," issued in connection with U.S. Appl. No. 12/467,152, mailed on Feb. 17, 2012 (8 Pages).

United States Patent and Trademark Office, "Final Office Action," issued in connection with U.S. Appl. No. 12/467,152, mailed on Dec. 5, 2012 (19 pages).

United States Patent and Trademark Office, "Non-Final Office Action," issued in connection with U.S. Appl.No. 12/467,152, mailed on Apr. 12, 2013 (17 pages).

Chinese State Intellectual Property Office, "Second Office Action," issued in connection with Chinese Application No. 200980143481.9, mailed on Mar. 21, 2013 (16 pages).

United States Patent and Trademark Office, "Notice of Allowance," issued in connection with U.S. Appl. No. 12,467,152, mailed on Oct. 25, 2013, 10 pages.

* cited by examiner

FLUID FLOW CONTROL MEMBERS FOR USE WITH VALVES

RELATED APPLICATION

This patent arises from a divisional of U.S. patent application Ser. No. 12/202,876, filed Sep. 2, 2008, which is hereby incorporated herein by reference in its entirety.

FIELD OF THE DISCLOSURE

This patent relates generally to fluid flow control members and, more specifically, to fluid flow control members for use with valves.

BACKGROUND

Internal valves are used in a variety of commercial and industrial applications to control fluid flow between a fluid storage container and another container, hose, pipeline, etc. Typically, internal valves are provided with an equalization member to equalize fluid pressure across the valve prior to fully opening the valve. The rate at which the fluid pressure equalizes across the valve is associated with the size of the valve and the fluid flow rate through the equalization member.

To equalize the pressure across known internal valves, these valves are provided with a stem having a cut-away portion or grove that varies the fluid flow rate through the equalization member depending on the position of the cut-away portion or groove relative to an aperture that fluidly couples the valve to the container, hose, pipeline, etc. Specifically, if the cut-away portion or groove is adjacent the aperture, the size of the fluid flow path is relatively large and, in contrast, if the cut-away portion or groove is at a distance from the aperture, the size of the fluid flow path is relatively small.

Different internal valves have different diameter apertures and different size stems. Accordingly, the diameter of the aperture is restricted by the size of the valve and the amount of material that may be removed from the stem to create the cut-away portion or groove is restricted by the size of the stem. Generally, removing material from a body decreases its structural integrity and, therefore, the amount of material that can be removed from the stem is limited to an amount that enables the structural integrity of the stem to be maintained while providing a fluid flow path to equalize the pressure across the valve. As a result, the speed at which known internal valves can be fully opened is limited by the amount of material that can be removed from the stem.

Additionally, the cut-away portion or groove creates a non-cylindrical surface on the stem. Due to manufacturing tolerances, the stem may rub against the aperture as the stem is moved. Unlike smooth cylindrical surfaces, the non-cylindrical surface has edges that may wear a groove(s) within the aperture, which decreases the useful life of the valve. Additionally, in some instances, the engagement between these edges and the aperture causes the valve to malfunction.

SUMMARY

An example fluid flow control member for use with a valve in accordance with the teachings of this disclosure includes a body having a seat to control a fluid flow through the valve. The body defines a seating surface, an aperture to receive a stem of the valve and a plurality of substantially flat surfaces to enable gripping an exterior surface of the body.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example poppet and excess flow valve apparatus described herein increases the rate at which, for example, an internal valve may be fully opened. In particular, the example apparatus (e.g., a poppet) is provided with a plurality of fluid flow channels that fluidly couple a chamber of the valve to another chamber, hose, pipeline, etc. Specifically, the plurality of fluid flow channels may have a cross-sectional area that is approximately sixteen times greater than the cross cross-sectional area provided by a fluid flow channel of known internal valves. As a result, when a seat of the example apparatus disengages a seating surface, fluid may rapidly flow through the plurality of fluid flow channels to quickly equalize the pressure across the valve. Once the pressure is equalized, the valve may be fully opened. Additionally, the example apparatus described herein enables the valve to be implemented using a substantially cylindrical stem, which prevents the problems encountered by known stems (e.g., stems having cut-away portions or grooves) used to implement known internal valves.

Additionally, the example apparatus may include a spring seat that engages a surface of, for example, a poppet when the valve is fully open to prevent the flow of fluid through the fluid flows channels, thereby maintaining the proper function of an excess flow valve associated with the poppet. In some examples, the surface is a surface of a sliding member positioned and biased within a bore of the poppet. If a stem of the valve further extends while the spring seat engages the surface, the sliding member slides within the bore to enable, for example, a cam to rotate between 50° and 70° travel, which fully opens the valve. Once the spring seat disengages the surface, a biasing element within the bore returns the sliding member to a rest position.

Figure 1:
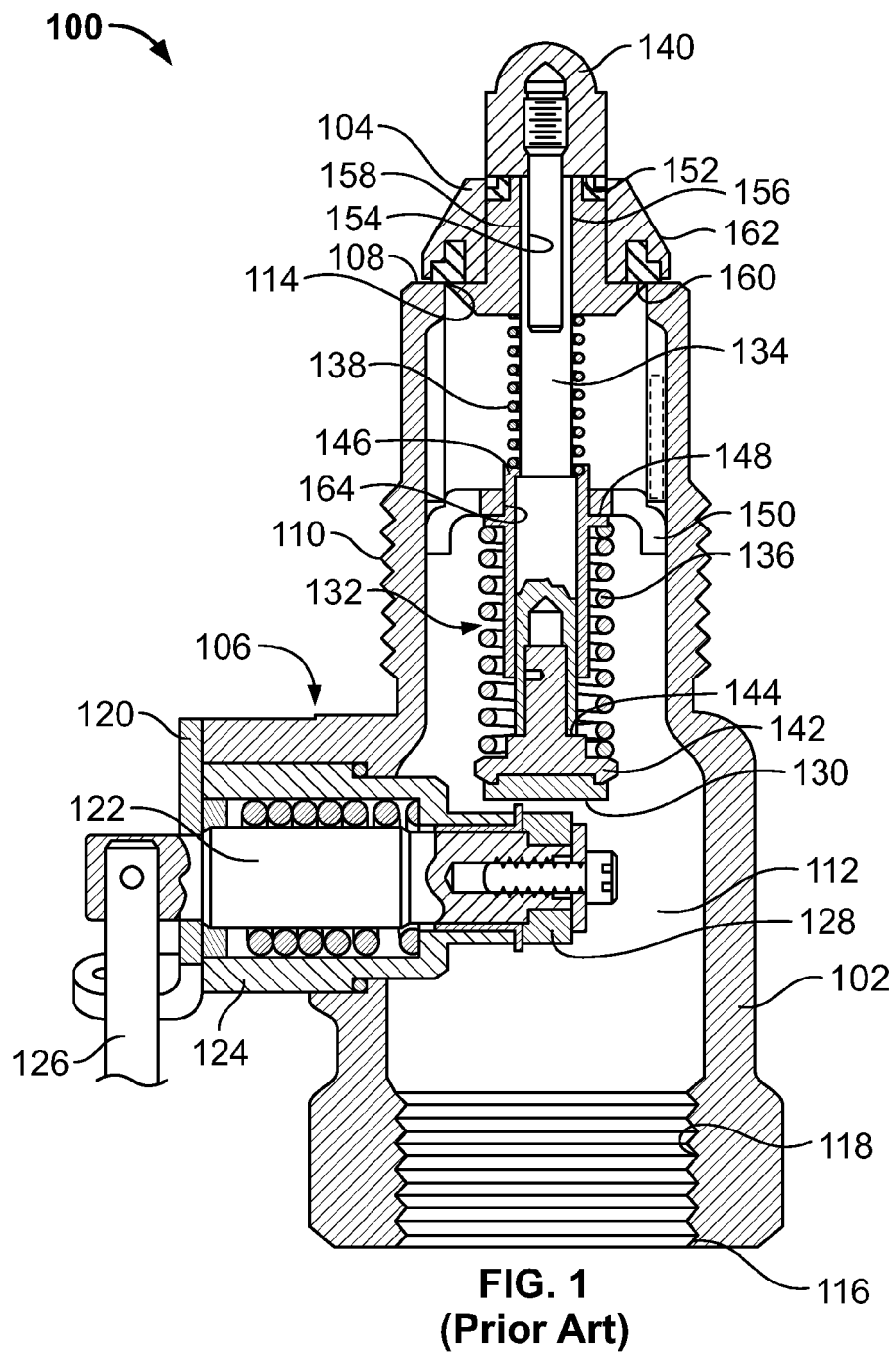
FIG. 1 depicts a known internal valve.

FIG. 1 depicts a known internal valve 100 that has a body 102, a poppet 104, and a bonnet assembly 106. The bonnet assembly 106 is coupled to the body 102 and the poppet 104 sealingly engages a surface 108 of the body 102 to control fluid flow through the internal valve 100.

The body 102 includes exterior threads 110 that engage an opening (not shown) of a chamber or tank (not shown) such as a pumping system, a stationary storage tank, transport truck, etc. Additionally, the body 102 defines a bore 112 having a first opening 114 and a second opening 116 to fluidly couple the chamber or tank to another chamber, a hose, a pipeline, etc. Specifically, the bore 112 includes internal threads 118 to threadingly engage another body (not shown) such as, for example, a coupling of a LPG hose.

The bonnet assembly 106 is coupled to the body 102 via a plate 120. The bonnet assembly 106 includes a shaft 122 that is partially positioned within and rotationally coupled to a bonnet 124. The shaft 122 includes an external lever 126 to rotate the shaft 122 relative to the bonnet 124 and the body 102. A cam 128 is coupled to the shaft 122 opposite the external lever 126 and is positioned within the bore 112. As the shaft 122 is rotated, the cam 128 engages a surface 130 to move a stem assembly 132 within the bore 112.

The stem assembly 132 includes a stem 134, a first spring 136, a second spring 138 and a plug 140. A first spring seat 142 is coupled to an end 144 of the stem 134 and is positioned opposite a second spring seat 146 that surrounds the stem 134. A surface 148 of the second spring seat 146 engages a guide bracket 150 that guides the stem 134 relative to the body 102. The first spring 136 is positioned between the first spring seat 142 and the second spring seat 146 and the second spring 138 is positioned between the second spring seat 146 and the poppet 104. The plug 140 is coupled to the stem 134 opposite the first spring seat 142 and engages a seating surface 152 defined by the poppet 104. Additionally, a portion of the stem 134 is positioned within an aperture 154 defined by the poppet 104 adjacent the seating surface 152.

In practice, to equalize a pressure between a chamber or tank in which the internal valve 100 is mounted and the other chamber, hose, pipeline, etc. coupled to the second opening 116, the external lever 126 is rotated to position the cam 128 at a mid-point (e.g., 70° travel), which moves the stem assembly 132 to disengage the plug 140 from the seating surface 152 and positions a cut-away portion or groove 202 (FIG. 2) of the stem 134 adjacent to the aperture 154. As discussed above, positioning the cut-away portion or groove 202 (FIG. 2) adjacent to the aperture 154 increases the size of a fluid flow channel 156 between the stem 134 and a surface 158 of the aperture 154, which enables a relatively large amount of fluid to bleed between the chamber or tank and the other chamber, hose, pipeline, etc. to equalize the pressure across the internal valve 100.

Once the fluid pressure is equalized, the internal valve 100 may be fully opened. Specifically, the external lever 126 may be rotated to position the cam 128 at a high-point, which moves the stem assembly 132 to enable a seating surface 160 of the poppet 104 to disengage the surface 108 to allow fluid to flow from the other chamber, tank, etc. in which the internal valve 100 is mounted through the first opening 114. However, if the fluid flow increases to a magnitude greater than a predetermined fluid flow (e.g., an excess flow limit), a force exerted by the fluid flow against an external surface 162 of the poppet 104 overcomes a force exerted by the second spring 138 and causes the seating surface 160 of the poppet 104 to reengage the surface 108 even though the cam 128 is positioned at the high-point. In this position, while the seating surface 160 of the poppet 104 engages the surface 108, the plug 140 is at a distance from the seating surface 152 and a cylindrical portion 204 (FIG. 2) of the stem 134 is positioned adjacent the aperture 154. As discussed above, positioning the cylindrical portion 204 (FIG. 2) adjacent the aperture 154 decreases the size of the fluid flow channel 156 between the stem 134 and the surface 158 of the aperture 154, which enables a relatively small amount of fluid to bleed between the chamber or tank and the second opening 116.

Figure 3:
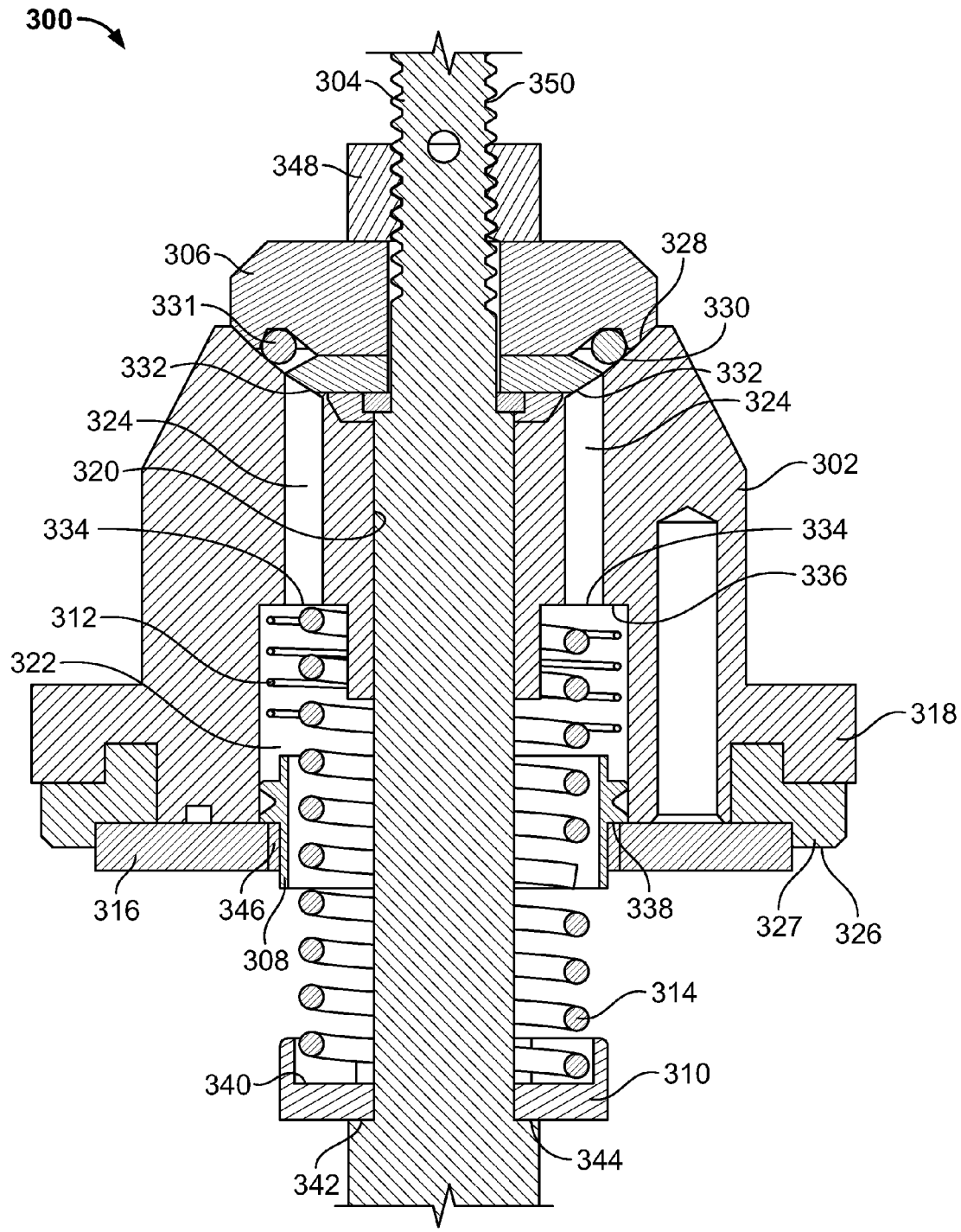
FIG. 3 depicts a portion of a poppet and excess flow valve assembly in a closed position.

FIG. 3 depicts a portion of an example poppet and excess flow valve assembly 300 that may be used in connection with internal valves such as, for example, the internal valve 100. Specifically, as described in more detail below, the assembly 300 may be used in place of the poppet 104, the stem assembly 132, and the plug 140 of FIG. 1. The poppet and excess flow valve assembly 300 includes an example fluid flow control member or poppet 302, a stem 304 and a plug 306. Additionally, the assembly 300 includes a sliding member 308, a spring seat 310, a first biasing element 312, a second biasing element 314 and a plate 316 that is coupled to a body 318 of the poppet 302.

The body 318 defines an aperture 320 that receives the stem 304, a bore 322 that is coaxially aligned with the aperture 320 and a plurality of fluid flow channels 324 that may be coaxially aligned with the aperture 320. The plurality of fluid flow channels 324 fluidly couple a chamber of a valve (not shown) to another chamber or vessel such as, for example, a pumping system, a stationary storage tank, a transport truck, or any other suitable chamber, etc. In contrast to the fluid flow channel 156 of FIG. 1, the plurality of fluid flow channels 324 do not significantly impact or impair the structural integrity of the stem 304 or the poppet 302. As a result, a cross-sectional area of the plurality of fluid flow channels 324 may be at least approximately sixteen times greater than the cross-sectional area of the fluid flow channel 156. In other example implementations, the cross-sectional area of the plurality of fluid flow channels 324 may vary depending on the application and/or the size of the valve with which the poppet 302 is used. As discussed in more detail below, providing a relatively larger fluid flow area enables the fluid flow rate through the valve to be significantly increased during opening of the valve, which also increases the rate at which pressure across the valve equalizes and, as a result, the rate in which the valve may be fully opened.

Additionally, the poppet 302 has a first seating surface 326 and a second seating surface 328 that is opposite the first seating surface 326. The first seating surface 326 surrounds the bore 322 and includes a seal, gasket or o-ring 327 that is positioned between the body 318 and the plate 316. In some example implementations, the first seating surface 326 is to sealingly engage the surface 108 (FIG. 1) of the internal valve 100 (FIG. 1) to control fluid flow through the internal valve 100 (FIG. 1). Similarly, the second seating surface 328 is to be sealingly engaged by a seat 330 of the plug 306 having a seal, gasket or o-ring 331. The interaction between the seat 330 and the second seating surface 328 controls fluid flow through the plurality of fluid flow channels 324.

In this example implementation, the plurality of fluid flow channels 324 are substantially coaxial with the aperture 320. Additionally, each of the plurality of fluid flow channels 324 has a first opening 332 that is opposite a second opening 334. The first opening 332 is positioned between the aperture 320 and the second seating surface 328 and the second opening 334 is adjacent a surface 336 of the bore 322.

The first biasing element 312 (e.g., a spring) is positioned within the bore 322 between the surface 336 and the sliding member 308 to urge the sliding member 308 away from the body 318. Specifically, the first biasing element 312 drives a surface 338 of the sliding member 308 toward the plate 316. The second biasing element 314 (e.g., a spring) is partially positioned within the bore 322 between the surface 336 and a first surface 340 of the spring seat 310. The second biasing element 314 urges the spring seat 310 away from the body 318 and urges the seat 330 of the plug 306 toward the second seating surface 328. To couple the spring seat 310 to the stem 304, the stem 304 defines a stepped portion 342. The spring seat 310 surrounds the stem 304 and a second surface 344 of the spring seat 310 engages the stepped portion 342.

Figure 4:
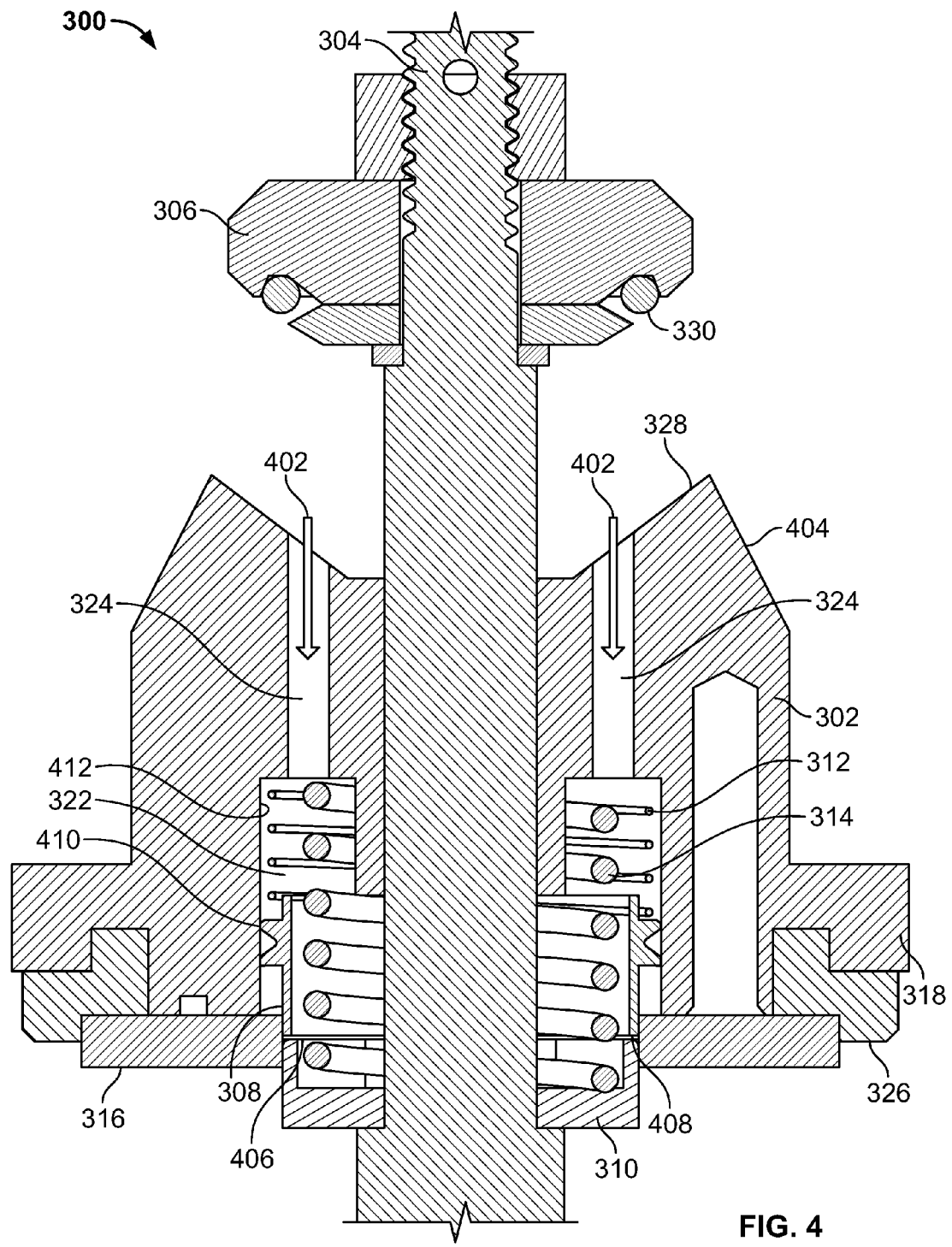
FIG. 4 depicts the portion of the poppet and excess flow valve of FIG. 3 in an opened position.

In some examples, to equalize the pressure across the valve in which the assembly 300 is mounted (e.g., a valve similar to the internal valve 100 of FIG. 1), the external lever 126 (FIG. 1) is rotated to position the cam 128 (FIG. 1) to the mid-point (e.g., 70° travel), which moves the stem 304 and disengages the seat 330 from the second seating surface 328. The size of the aperture 320 substantially corresponds to the size of the stem 304 to guide the stem 304 relative to the poppet 302. As shown in FIG. 4, once the seat 330 disengages the second seating surface 328, fluid rapidly flows through the plurality of fluid flow channels 324 in a direction generally indicated by arrows 402. As the fluid flows through the plurality of fluid flow channels 324, the pressure across the valve equalizes. However, in other examples, a fluid may flow in a direction substantially opposite the direction indicated by arrows 402 such as, for example, during a fluid backflow.

Figure 2:
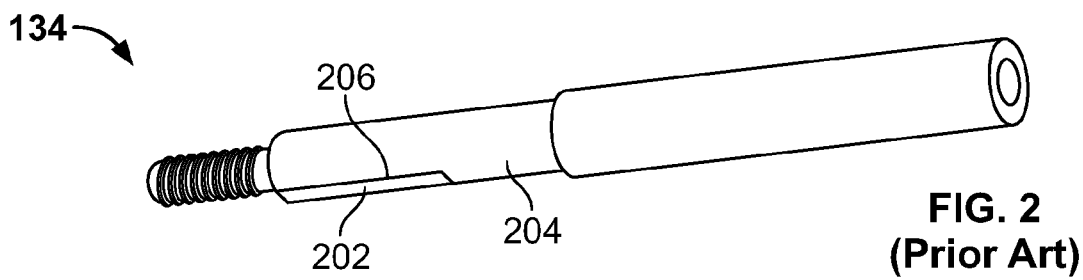
FIG. 2 depicts a stem used to implement the known internal valve of FIG. 1.

Turning briefly to FIG. 2, as discussed above, due to manufacturing tolerances, the stem 134 of the known internal valve 100 may rub against the aperture 154 (FIG. 1) as the stem 134 and/or the poppet 104 (FIG. 1) move to control the fluid flow through the internal valve 100 (FIG. 1). For example, the cut-away portion or groove 202 has edges 206 that may wear a groove(s) within the aperture 154 (FIG. 1), which decreases the useful life of the poppet 104 (FIG. 1) and/or increases the rate at which maintenance must be performed on the internal valve 100 (FIG. 1). Additionally, the engagement between the edges 206 and the aperture 154 (FIG. 1) may cause the plug 140 (FIG. 1) and/or the poppet 104 (FIG. 1) to become stuck in an open position enabling fluid to continue to flow through the internal valve 100 (FIG. 1). In contrast, providing the poppet 302 with the plurality of fluid flow channels 324, enables the stem 304 to have a cylindrical body, which eliminates the problems discussed above encountered with the known internal valve 100 (FIG. 1).

Once the fluid pressure is equalized across the internal valve 100 and/or between the other chamber (e.g., a hose, a pipeline, tank, etc. coupled to the second opening 116) and the chamber of the valve, the internal valve 100 may be fully opened. Specifically, the external lever 126 (FIG. 1) may be rotated to position the cam 128 (FIG. 1) at a high-point, which moves the stem 304 and disengages the first seating surface 326 from the body of the valve to allow fluid to flow from the other chamber, hose, pipeline, etc. through, for example, the first opening 114 of FIG. 1.

Turning now to FIG. 4, if the fluid flow increases to a magnitude greater than a predetermined fluid flow (e.g., an excess flow limit), a force exerted by the fluid flow against an external surface 404 of the poppet 302 overcomes a force exerted by the second biasing element 314 and causes the first seating surface 326 to reengage the body of the valve even though the cam 128 (FIG. 1) is positioned at the high-point. In this position, while the first seating surface 326 of the poppet 302 engages the body of the valve, the plug 306 is at a distance from the second seating surface 328 and a surface 406 of the spring seat 310 engages a surface 408 of the sliding member 308 to control fluid flow through the valve. Specifically, the engagement between the surface 406 of the spring seat 310 and the surface 408 of the sliding member 308 limits the fluid flow through the plurality of fluid flow channels 324 to be at or below a leakage rate of, for example, an effective aperture corresponding to a number 60 drill size. However, other leakage rates and/or aperture sizes may be used to suit the needs of a given application.

The sliding member 308 has an exterior surface 410 that slideably and sealingly engages a surface 412 of the bore 322. If the stem 304 further extends after the surface 406 of the spring seat 310 engages the surface 408 of the sliding member 308, the sliding member 308 moves along with the stem 304 and the spring seat 310 within the bore 322. As the stem 304 retracts and the surface 406 of the spring seat 310 moves away from the body 318, the first biasing element 312 moves the sliding member 308 away from the body 318 and toward the plate 316.

To install (e.g., retrofit) the example assembly 300 on the known internal valve 100 (FIG. 1), initially, the fluid pressure is reduced (e.g., drained) from the chamber or tank and the internal valve 100 (FIG. 1) is then unscrewed from the chamber or tank. The bonnet assembly 106 (FIG. 1) is then removed from the internal valve 100, and the plug 140 is unthreaded from the stem 134 (FIG. 1) to remove the poppet 104 (FIG. 1). The stem assembly 132 is then removed from the internal valve 100 (FIG. 1).

To install the example assembly 300 on the internal valve 100, the first spring seat 142 (FIG. 1) is threaded onto the stem 304 and the first spring 136 (FIG. 1) and the second spring seat 146 (FIG. 1) are positioned around the stem 304. The stem 304 is then guided through an opening 164 (FIG. 1) of the guide bracket 150 (FIG. 1) and the spring seat 310 is positioned on the stem 304 adjacent the stepped portion 342. Next, the second biasing element 314 is positioned around the stem 304 adjacent the first surface 340, and the stem 304 is then guided through the aperture 320 of the poppet 302 that has the first biasing element 312 and the sliding member 308 positioned within the bore 322 by the plate 316 (e.g., a lip 346 of the plate 316). The plug 306 is then positioned on the stem 304 and a nut 348 is threaded onto a threaded end 350 of the stem 304 to position the plug 306 between the nut 348 and the body 318. The bonnet assembly 106 (FIG. 1) may then be reattached to the internal valve 100 (FIG. 1).

Figure 5:
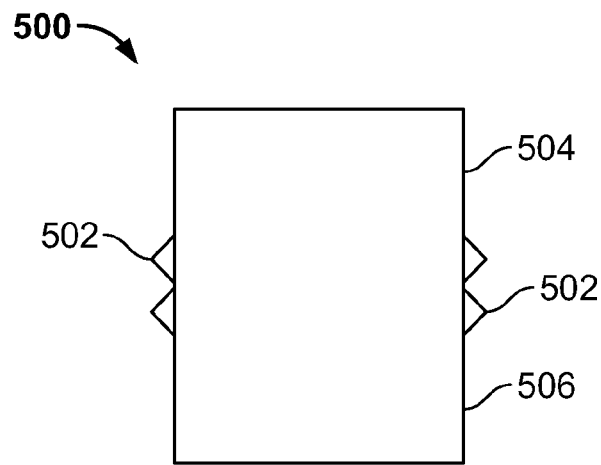
FIG. 5 depicts an alternative sliding member that may be used to implement the poppet and excess flow valve of FIG. 3.

FIG. 5 depicts an example symmetrical sliding member 500 that may be used to implement the example assembly 300 of FIG. 3. The symmetrical sliding member 500 is similar to the sliding member 308 of FIG. 3. The symmetrical sliding member 500 includes an exterior surface 502 that slideably and sealingly engages the surface 412 (FIG. 4) of the bore 322 (FIG. 4). Additionally, the symmetrical sliding member 500 includes a first portion 504 and a second portion 506. The first portion 504 is positioned on an opposite side of the exterior surface 502 as the second portion 506. The first portion 504 is substantially the same size as the second portion 506. Forming the first portion 504 substantially the same size as the second portion 506 increases the ease of manufacture of the symmetrical sliding member 500. Additionally, forming the first portion 504 to be substantially the same size as the second portion 506 decreases the likelihood that the symmetrical sliding member 500 is installed incorrectly (e.g., upside down) within the bore 322 of the poppet 302 during assembly.

Figure 6:
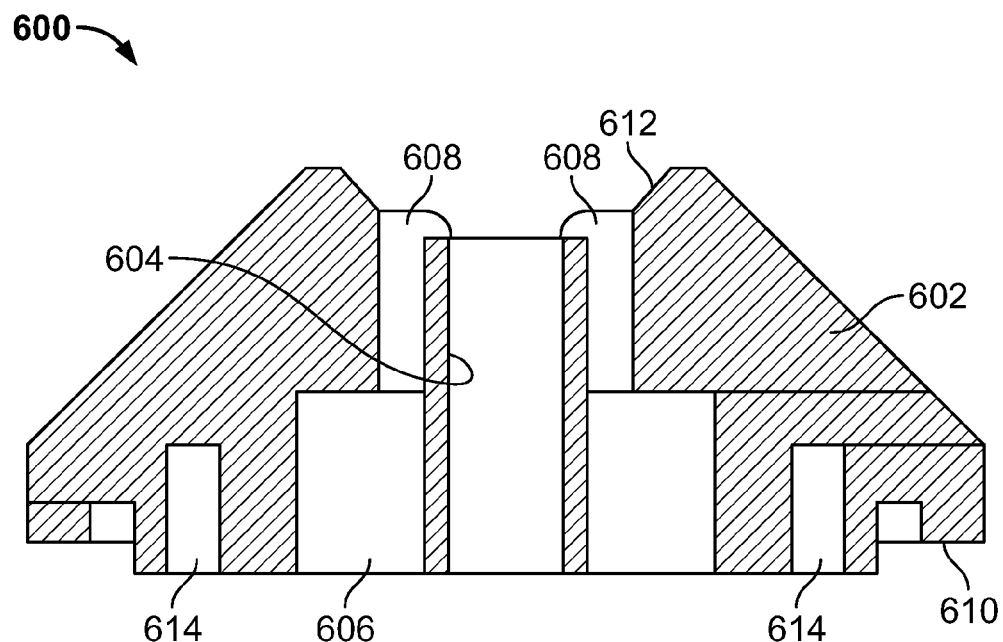
FIG. 6 depicts an example poppet that may be used to implement the poppet and excess flow valve of FIG. 3.

FIG. 6 depicts an example fluid flow control member or poppet 600 that may be used to implement the example assembly 300 of FIG. 3. The poppet 600 is similar to the poppet 302 of FIG. 3. The poppet 600 has a body 602 that defines an aperture 604, a bore 606 that is coaxially aligned with the aperture 604, a plurality of fluid flow channels 608, a first seating surface 610 and a second seating surface 612 that is opposite the first seating surface 610. Additionally, the body 602 defines a plurality of openings, cavities or crevices 614 that reduce the amount of material used during casting to make the overall weight of the poppet 600 substantially the same as the weight of the known poppet 104 of FIG. 1.

Although the poppet 302 (FIG. 3) is depicted as implemented in connection with the assembly 300 (FIG. 3) for use with an internal valve, in other example implementations, the poppets 302 or 600 or any other example apparatus described herein may be implemented in connection with any other suitable fluid control device such as, for example, emergency shut off valves.

Figure 7:
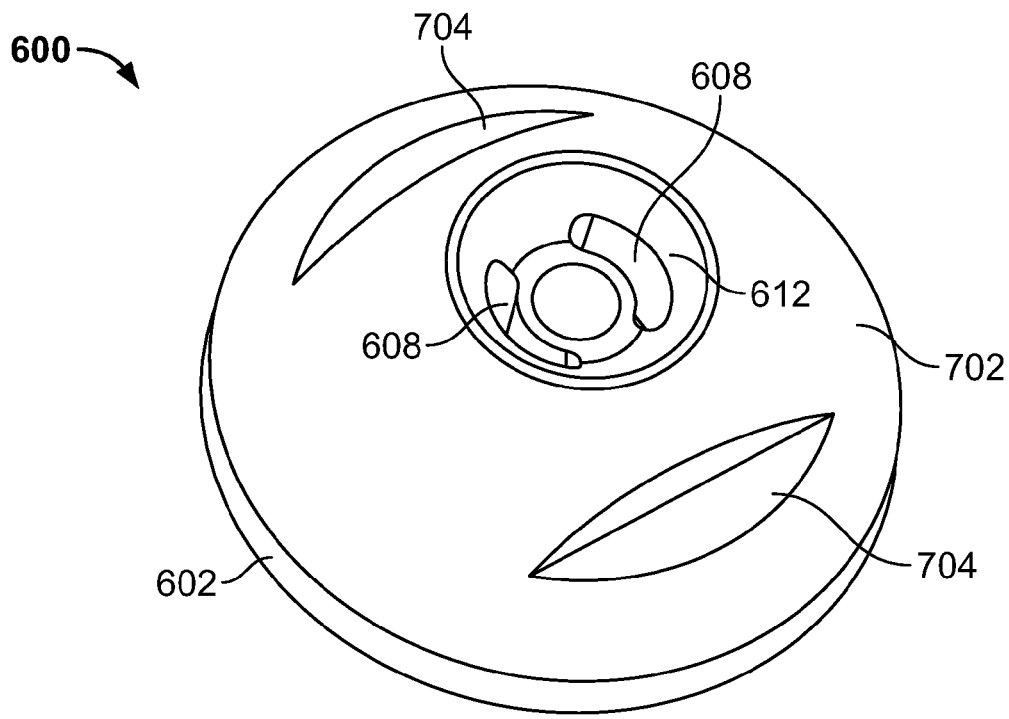
FIG. 7 depicts a top view of the example poppet of FIG. 6.

FIG. 7 depicts an external surface 702 (e.g., a tapered external surface) of the example poppet 600, the second seating surface 612 and the plurality of fluid flow channels 608. While two fluid flow channels 608 are depicted in the example poppet 600, any other number of fluid flow channels (e.g., 1, 2, 3, 4, etc.) having any other suitable shape (e.g., circular, oval, triangular, rectangular, etc.) or size may be used instead. The external surface 702 defines a plurality of substantially flat step-shaped surfaces 704 that may be advantageously used to enable gripping the poppet 600 in, for example, a bench vice or any other suitable holding device.

In practice, the poppet 600 may be exposed to substances and/or chemicals that corrode, for example, the gasket or o-ring 327 (FIG. 3) of the first seating surface 610, which prevents a substantially bubble tight seal between the first seating surface 610 and the body of the valve. To replace the gasket or o-ring 327 (FIG. 3), the poppet 600 is removed from the valve as described above and the plate 316 (FIG. 3) may then be removed from the body 602. Unfortunately, during removal of the plate 316 (FIG. 3), due to exposure to the substances and/or chemicals, a plurality of fasteners (not shown) (e.g., screws) that couple the plate 316 (FIG. 3) to the body 602 may break off within the body 602. To remove the damaged fastener(s), a pilot hole (not shown) is drilled into the fastener, an end (not shown) of an extractor (not shown) is tapped into the pilot hole, and then the extractor is turned (e.g., counter-clockwise) to remove the damaged fastener. If a technician attempts to clamp the known poppet 104 of FIG. 1 between the jaws of a vice, any contact point on the external surface 162 of the poppet 104 (FIG. 1) has a circular cross-section, which only enables each jaw of the vice to engage a single contact point on the poppet 104 (FIG. 1), which allows the poppet 104 (FIG. 1) to move and/or slip while a damaged faster is extracted from the poppet 104 (FIG. 1) and/or the gasket or o-ring 327 (FIG. 3) is replaced. In contrast, the flat surfaces 704 of the example poppet 600 are substantially parallel to one another. The parallel alignment of the flat surfaces 704 enables the jaws of a vice to engage numerous contact points on the flat surfaces 704 and, thus, securely position the poppet 600 between the jaws of the vice while a damaged faster is extracted, the gasket or o-ring 327 is replaced and/or any other procedure is performed while the poppet 600 is secured between the jaws of the vice. After the plate 316 (FIG. 3) is removed from the body 602, the gasket or o-ring 327 is replaced and the plate 316 may then be recoupled to the body 602.

Figure 8:
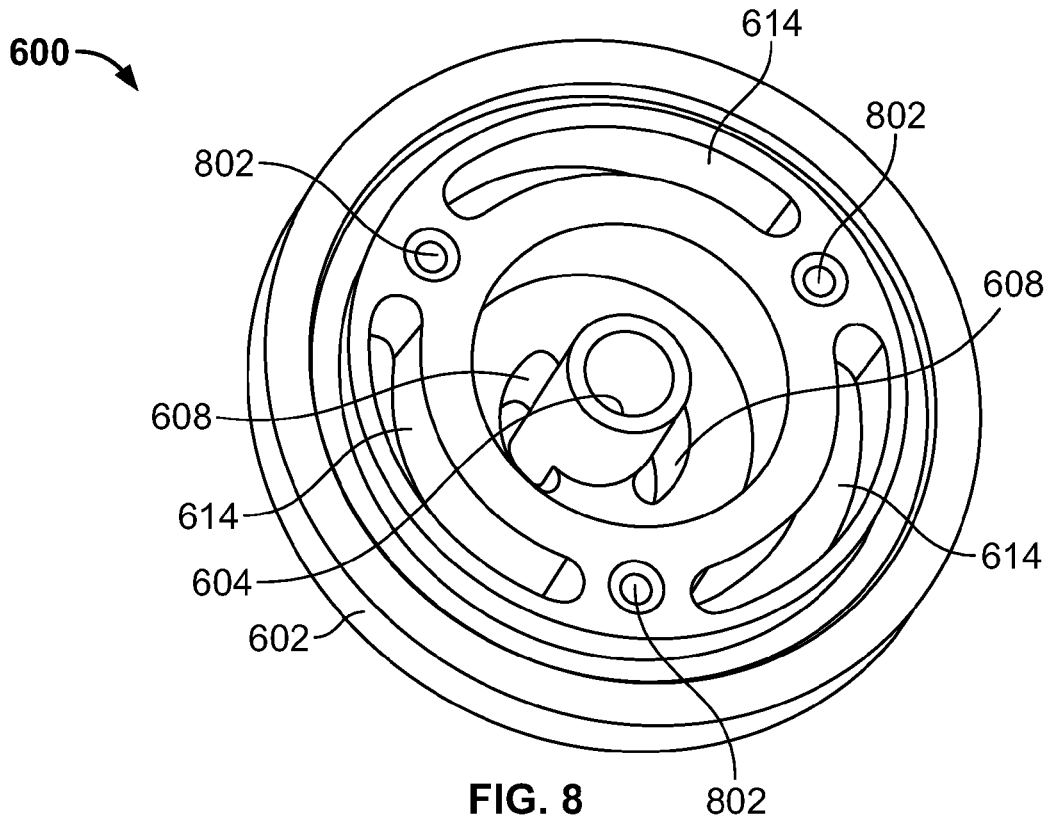
FIG. 8 depicts a bottom view of the example poppet of FIG. 6.

FIG. 8 depicts a plurality of threaded holes 802 that each receive one of the plurality of fasteners to couple the plate 316 (FIG. 3) to the body 602. Additionally, FIG. 8 depicts the plurality of fluid flow channels 608, the plurality of openings, cavities or crevices 614 and the aperture 604 that is sized to guide the stem 304 (FIG. 3) relative to the poppet 600.

Figure 9A:
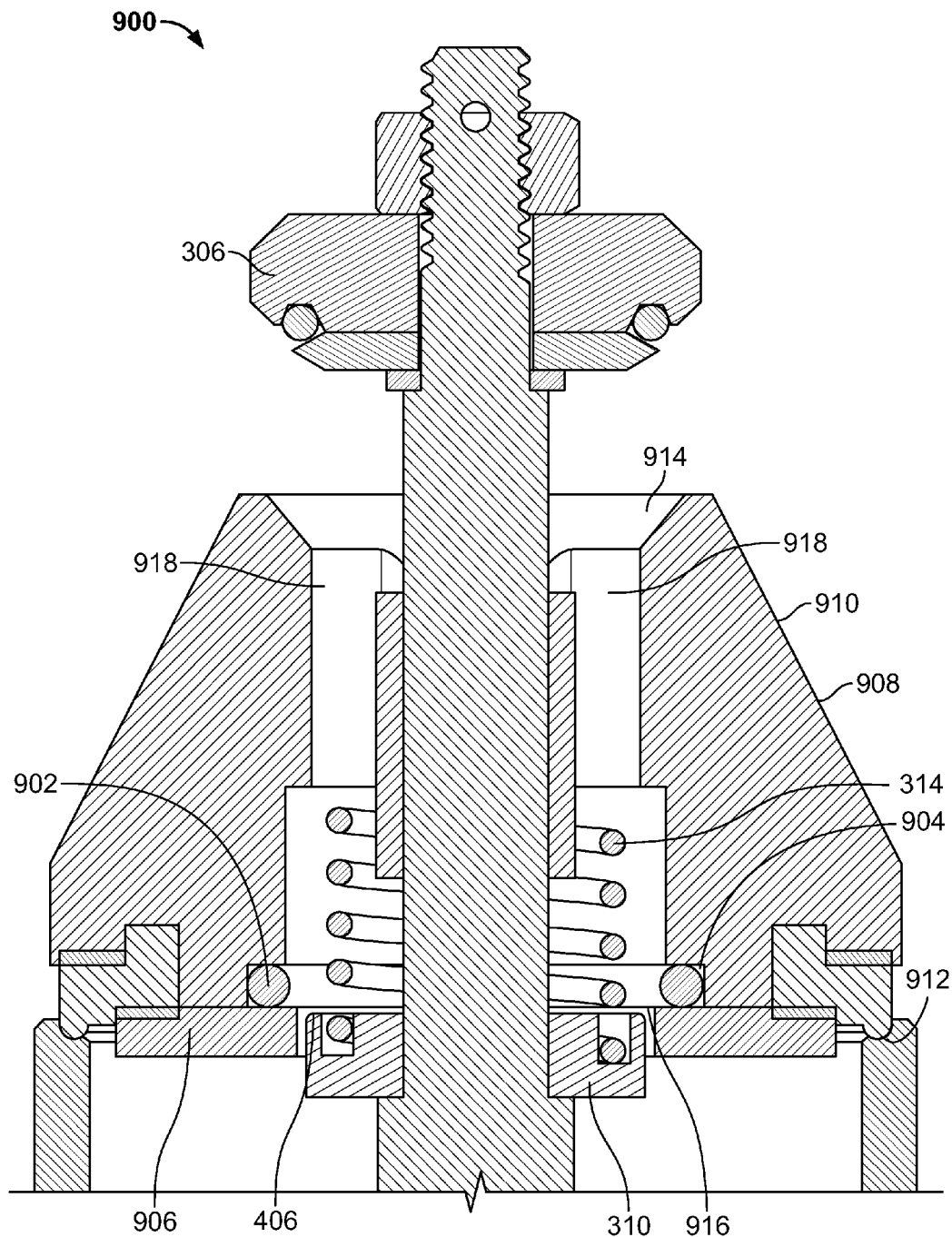
FIG. 9A depicts an example alternative configuration that may be used to implement the poppet and excess flow valve of FIG. 3.

FIG. 9A depicts an alternative example configuration 900 in which a seal 902 (e.g., a gasket or o-ring) is positioned within a bore or groove 904 between a plate 906 and a poppet 908. The plate 906 is coupled to the poppet 908 via a plurality of fasteners (not shown). In practice, as discussed above, if the fluid flow increases to a magnitude greater than a predetermined fluid flow (e.g., an excess flow limit), a force exerted by the fluid flow against an external surface 910 of the poppet 908 overcomes a force exerted by the second biasing element 314 and causes a first seating surface 912 to reengage the body of the valve even though the cam 128 (FIG. 1) is positioned at the high-point. In this position, while the first seating surface 912 of the poppet engages the body of the valve, the plug 306 is at a distance from a second seating surface 914 and the surface 406 of the spring seat 310 engages a surface 916 of the seal 902 to control fluid flow through the valve. Specifically, the engagement between the surface 406 of the spring seat 310 and the surface 916 of the seal 902 limits the fluid flow through a plurality of fluid flow channels 918 to be at or below a leakage rate of, for example, an effective aperture corresponding to a number 60 drill size.

Figure 9B:
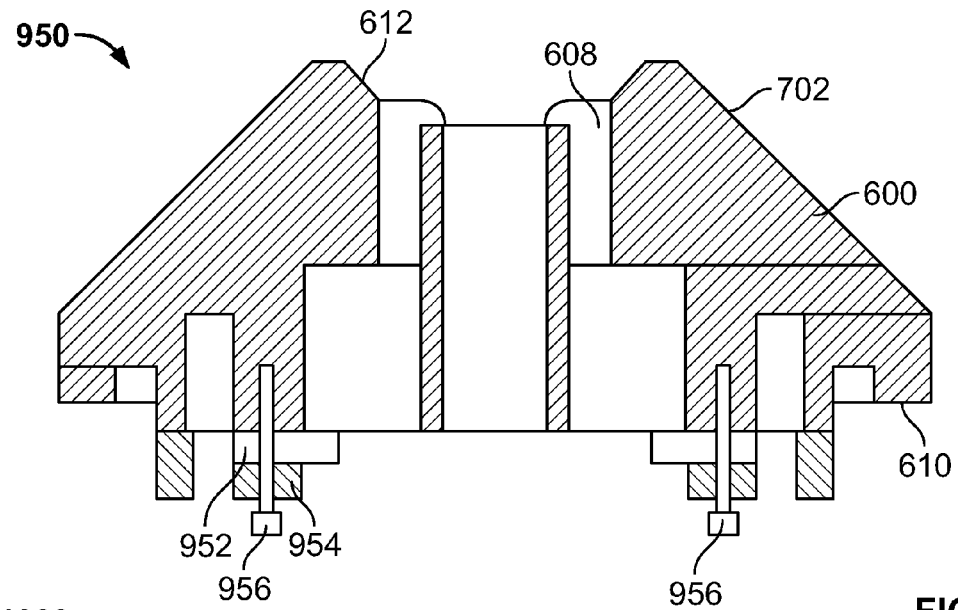
FIG. 9B depicts another example alternative configuration that is similar to the example depicted in FIG. 9A and which may be used to implement the poppet and excess flow valve of FIG. 3.

FIG. 9B depicts an alternative example configuration 950 in which a seal 952 (e.g., a gasket or o-ring) is positioned between a plate 954 and the poppet 600. The plate 954 is coupled to the poppet 600 via a plurality of fasteners 956. The operation of the example configuration 950 is substantially similar to the operation of the example configuration 900 and, thus, the operation of the example configuration 950 will not be repeated here.

Figure 10:
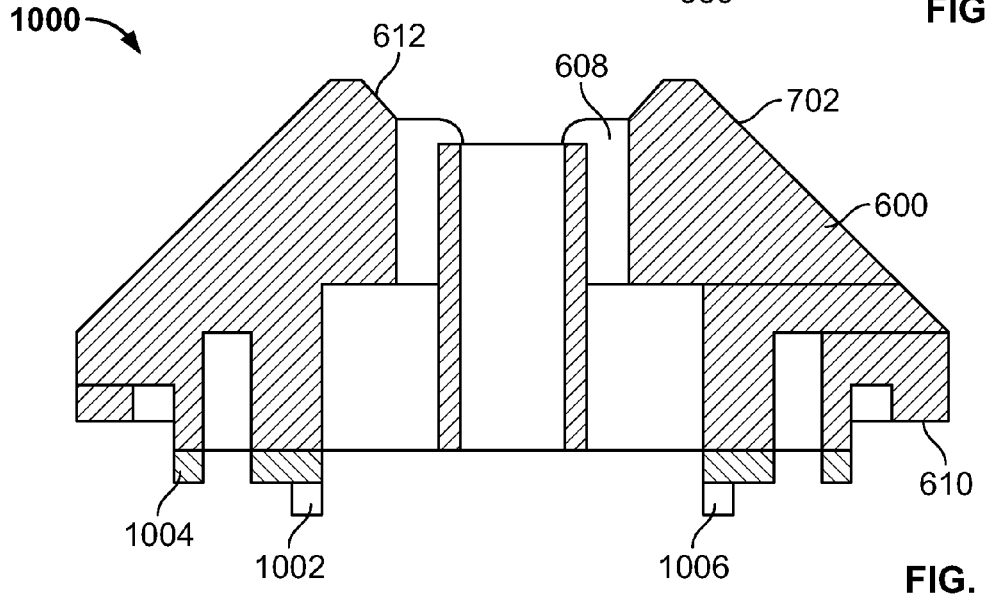
FIG. 10 depicts another example alternative configuration that may be used to implement the poppet and excess flow valve of FIG. 3.

FIG. 10 depicts an alternative example 1000 in which a seal 1002 (e.g., a gasket or o-ring) is coupled and/or molded to a plate 1004. In practice, if the fluid flow increases to a magnitude greater than a predetermined fluid flow (e.g., an excess flow limit), a force exerted by the fluid flow against the external surface 702 of the poppet 600 overcomes a force exerted by the second biasing element 314 (FIG. 3) and causes the first seating surface 610 to reengage the body of the valve even though the cam 128 (FIG. 1) is positioned at the high-point. In this position, while the first seating surface 610 of the poppet 600 engages the body of the valve, the plug 306 (FIG. 3) is at a distance from the second seating surface 612 and the surface 406 (FIG. 4) of the spring seat 310 (FIG. 3) engages a surface 1006 of the seal 1002 to control fluid flow through the valve. Specifically, the engagement between the surface 406 (FIG. 4) of the spring seat 310 (FIG. 3) and the surface 1006 of the seal 1002 limits the fluid flow through the plurality of fluid flow channels 608 to be at or below a leakage rate of, for example, an effective aperture corresponding to a number 60 drill size.

Figure 11:
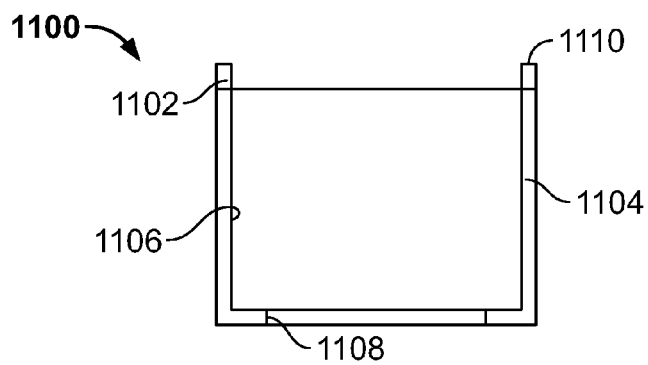
FIG. 11 depicts an example spring seat that may be used to implement the poppet and excess flow valve of FIG. 3.

FIG. 11 depicts an example spring seat 1100 that includes a seal 1102 to engage a surface and/or the lip 346 (FIG. 3) of the plate 316 (FIG. 3). The spring seat 1100 has a body 1104 that defines a bore 1106 and an opening 1108. The diameter of the opening 1108 substantially corresponds to the diameter of the stem 304 (FIG. 3).

In practice, if the fluid flow increases to a magnitude greater than a predetermined fluid flow (e.g., an excess flow limit), a force exerted by the fluid flow against the external surface 404 (FIG. 4) of the poppet 302 (FIG. 3) overcomes a force exerted by the second biasing element 314 (FIG. 3) and causes the first seating surface 326 to reengage the body of the valve even though the cam 128 (FIG. 1) is positioned at the high-point. In this position, while the first seating surface 326 of the poppet 302 (FIG. 3) engages the body of the valve, the plug 306 (FIG. 3) is at a distance from the second seating surface 328 (FIG. 3) and a surface 1110 of the seal 1102 engages the surface and/or the lip 346 (FIG. 3) of the plate 316 (FIG. 3) to control fluid flow through the valve. Specifically, the engagement between the surface 1110 of the seal 1102 and the surface and/or the lip 346 (FIG. 3) limits the fluid flow through the plurality of fluid flow channels 324 (FIG. 3) to be at or below a leakage rate of, for example, an effective aperture corresponding to a number 60 drill size.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A fluid flow control member for use with a valve, comprising:
    a body having a seat to control a fluid flow through a valve, wherein the body defines:
        a seating surface;
        an aperture to receive a stem of the valve; and
        a plurality of substantially flat surfaces to enable gripping an exterior surface of the body, wherein the exterior surface defines a conically shaped portion.

2. The fluid flow control member as defined in claim 1, wherein the fluid flow control member is a poppet for use with the valve.

3. The fluid flow control member as defined in claim 1, wherein the plurality of substantially flat surfaces comprise step-shaped surfaces.

4. The fluid flow control member as defined in claim 1, further comprising at least one fluid flow channel through the body to fluidly couple a chamber of the valve to another chamber.

5. The fluid flow control member as defined in claim 4, wherein the at least one fluid flow channel has an opening positioned adjacent the aperture and the seat.

6. The fluid flow control member as defined in claim 4, wherein the at least one fluid flow channel is to increase a fluid flow rate between the other chamber and the chamber of the valve.

7. The fluid flow control member as defined in claim 4, wherein the at least one fluid flow channel is to increase a rate at which a pressure of the other chamber equalizes with a pressure of the chamber of the valve.

8. The fluid flow control member as defined in claim 1, wherein the stem comprises a cylindrical body.

9. The fluid flow control member as defined in claim 1, wherein a size of the aperture corresponds to a size of the stem to guide the stem relative to the body.

10. The fluid flow control member as defined in claim 1, wherein the flat surfaces are substantially parallel to one another.

11. A fluid flow control member for use with a valve, comprising:
    a body having a seat to control a fluid flow through a valve, wherein the body defines:
        a seating surface;
        an aperture to receive a stem of the valve; and
        a plurality of substantially flat surfaces to enable gripping an exterior surface of the body, wherein the stem comprises a surface to substantially prevent fluid flow through the body when the seating surface sealingly engages the valve and a plug of the valve is in a fully open position.

12. A fluid flow control member for use with a valve, comprising:
    a body having a seat to control a fluid flow through a valve, wherein the body defines:
        a seating surface;
        an aperture to receive a stem of the valve;
        a plurality of substantially flat surfaces to enable gripping an exterior surface of the body; and
        fluid flow channels through the body to fluidly couple a chamber of the valve to another chamber, the fluid flow channels having separate openings adjacent the seating surface.

13. A fluid flow control member for use with a valve, comprising:
    a body having a seat to control a fluid flow through the valve, wherein the body defines:
        a seating surface;
        an aperture to receive a stem of the valve; and
        a plurality of substantially flat surfaces to enable gripping an exterior surface of the body; and
    a sliding member having an exterior surface to slidably and sealingly engage a bore defined by the body, the aperture is different than the bore.

14. The fluid flow control member as defined in claim 13, wherein the bore is coaxially aligned with the aperture and surrounded by the seat.

15. The fluid flow control member as defined in claim 13, further comprising a plate coupled to the body to position the sliding member within the bore.

16. The fluid flow control member as defined in claim 13, wherein the sliding member is to move relative to the bore in response to being engaged by the surface of the spring seat.

17. A fluid flow control member for use with a valve, comprising:
    a body having a seat to control a fluid flow through the valve, wherein the body defines:
        a seating surface;
        an aperture to receive a stem of the valve; and
        a plurality of substantially flat surfaces to enable gripping an exterior surface of the body;
    a sliding member having an exterior surface to slidably and sealingly engage a bore defined by the body;
    a plate coupled to the body to position the sliding member within the bore; and
    a biasing element positioned within the bore to urge the sliding member away from the body.

18. A fluid flow control member for use with a valve, comprising:
    a body having a seat to control a fluid flow through the valve, wherein the body defines:
        a seating surface;
        an aperture to receive a stem of the valve; and
        a plurality of substantially flat surfaces to enable gripping an exterior surface of the body; and
        a sliding member having an exterior surface to slidably and sealingly engage a bore defined by the body, wherein the sliding member has a surface to be engaged by a surface of a spring seat coupled to the stem to control a fluid flow between another chamber and a chamber of the valve.

19. A fluid flow control member for use with a valve, comprising:
    a body having a seat to control a fluid flow through the valve, wherein the body defines:
    a seating surface;
    an aperture to receive a stem of the valve; and
    a plurality of substantially flat surfaces to enable gripping an exterior surface of the body, wherein the flat surfaces comprise first surfaces being substantially parallel to one another and second surfaces being substantially co-planer to one another, respective first and second surfaces defining opposing steps.

* * * * *